Sept. 13, 1932. R. W. NEATE 1,876,731
BOWDEN CABLE, FLEXIBLE SHAFT, AND THE LIKE
Filed June 14, 1929
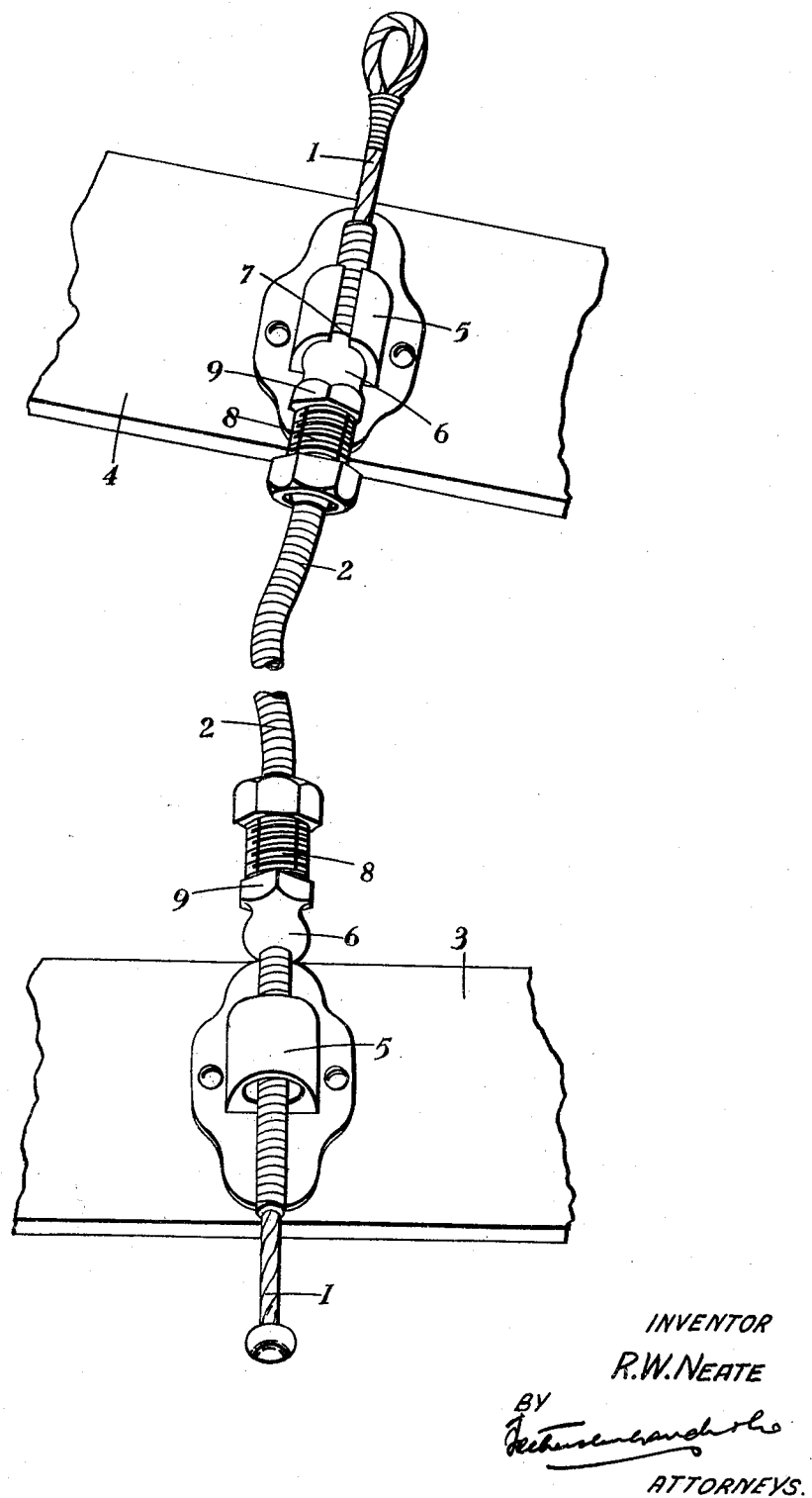
INVENTOR
R.W. NEATE
BY
ATTORNEYS.

Patented Sept. 13, 1932

1,876,731

UNITED STATES PATENT OFFICE

REGINALD WILLIAM NEATE, OF KINGSTON-ON-THE-THAMES, ENGLAND

BOWDEN CABLE, FLEXIBLE SHAFT AND THE LIKE

Application filed June 14, 1929, Serial No. 370,970, and in Great Britain August 8, 1928.

This invention relates to improvements in flexible connections and is particularly, but not necessarily exclusively, adapted for use with connecting cables or wires of the type known as Bowden cables or wires.

In flexible connections of this type it is necessary to fix two points of the cable casing to points which are fixed relatively to the cable, though not of course necessarily fixed to one another, and it is frequently desirable to remove the casing and cable from the two fixed mountings or to shorten the length of cable casing between said mountings in order to avoid an excessive amount of slack between the two fixed mountings.

The present invention has for its object inter alia to provide a flexible connection of the kind referred to and in which the necessary adjustments may be made in a very expeditious manner.

Another object of the present invention is to provide a connection which permits some angular movement of the cable casing at its supporting points.

A further object is to provide a cable casing which may be adjustably secured at any point along its length.

With the above and other objects in view the present invention resides in the construction and relative arrangement of parts more fully described hereinafter and as claimed in the appended claims.

In the accompanying sheet of drawing is shown by way of example one embodiment of my invention, the figure representing in plan view, and partially diagrammatically a Bowden brake coupling between a hauling vehicle and a trailer.

Referring to the figure, a mounting support for the cable 1 and casing 2 is provided on the trailer, one member of which is indicated at 3, and another mounting support is provided on the tractor or lorry hauling the trailer, one member of such tractor being indicated at 4. Each of the aforesaid mounting supports includes a socket member 5 and a member 6 mounted on the cable casing 2 and adapted to co-operate therewith in the manner of a ball-and-socket joint. The member 5 serving as a socket is mounted so as to be fixed to the trailer or tractor and is made in any desired form. In the example illustrated the socket is carried on a flange adapted to be secured to the trailer or tractor. In a slight modification, however, the cable 1 may have to pass through the member supporting the socket; in this case the socket may conveniently be of circular or bulbous shape and have a circular hole through which the cable may pass. The walls of the hole or socket mouth are preferably formed substantially cup-shaped so as to provide a seating for the ball members 6.

The socket is preferably provided with a slit as shown at 7, in the case of the member secured to the lorry, so that the cable may be passed into the aforesaid aperture or hole from the side and if desired such slot may be curved or tortuous to prevent accidental dislodging of the cable. If desired the method of securing the aforesaid socket members may include the provision of projecting lugs co-operating with recesses in the mounting surface so as to prevent tilting due, for example, to the weight of the casing, and to obviate undue strain on the bolts, screws or the like securing said socket.

The cable casing 2 will in general have its outer surface formed as a flexible screw-thread being formed for example of a tightly coiled wire or the like in the manner of a coiled spring, and accordingly the ball member above mentioned, will be formed so as to screw on to said casing. Said ball member comprises a curved portion, which may be of substantially spherical curvature, surrounding an aperture therein through which the cable may pass, said curved portion being adapted to co-operate with the cup-shaped surface of the socket member 5. The ball member has a projecting extension 8 slightly tapered externally coaxial with the cable casing and having an external thread for the reception of a locking nut 9. The tapered extension 8 is provided with one or more longitudinal slots so that upon screwing up the locking nut 9 the extension is slightly contracted and tightly grips the cable casing 2. Each nut 9 may be provided with a grub screw or the like for holding it in position or if desired a back nut may be provided for this purpose.

It will be apparent from the above description that the ball members may be secured at any point along the cable casing 2. Further, it will be understood that the ball members are held pressed against the respective socket members by reason of the tension in the cable within the casing.

The aforesaid ball coupling gives very great freedom of movement between a hauling vehicle and its trailer and further it is to be noted that in the event of the draw-bar between the vehicles becoming uncoupled the strain would only come on the brake cable so automatically applying the brake and avoiding any straining of the flexible casing.

The present invention is particularly applicable to trailer brakes although not necessarily exclusively limited thereto; it is well known, however, that in that connection it is frequently necessary to vary the length of the draw-bar between the vehicles and the present brake coupling enables that to be done without involving any special difficulties in the resetting of the brake controls, the varying lengths of cable and/or casing between the socket members and brakes, brake levers or the like will not in general be inconvenient since such lengths will be disposed underneath the vehicle.

Whilst a preferred embodiment of my invention has been described by way of example, I wish it to be understood that the particular details and arrangement of parts may be varied or modified without departing from the spirit and scope thereof.

I claim:

1. A support for a flexible cable comprising an attachment bracket, a tubular sleeve thereon, one end of which terminates in an enlarged substantially hemispherical socket, an internally threaded tubular sleeve adapted to screw onto the wire wrapping of a cable casing, means on said sleeve for securing it to said casing, and a head on said sleeve substantially hemispherical in contour adapted to seat within said socket.

2. A support for a flexible cable comprising an attachment bracket, a tubular sleeve thereon, one end of which terminates in an enlarged substantially hemispherical socket, a tubular sleeve having a tapering externally threaded portion which is longitudinally split, a nut to engage with said threaded portion for tightening it upon a cable casing, and a head on said sleeve substantially hemispherical in contour adapted to seat within said socket.

3. A support for a flexible cable comprising a longitudinally slotted attachment bracket, one end of which terminates in an enlarged substantially hemispherical socket, an externally tapered and externally threaded tubular sleeve adapted to surround the casing of the flexible cable, a nut for engagement with said external threads to tighten said sleeve upon said cable casing, and a substantially hemispherical head on said sleeve adapted to seat within said socket.

REGINALD WILLIAM NEATE.